Figure 1:
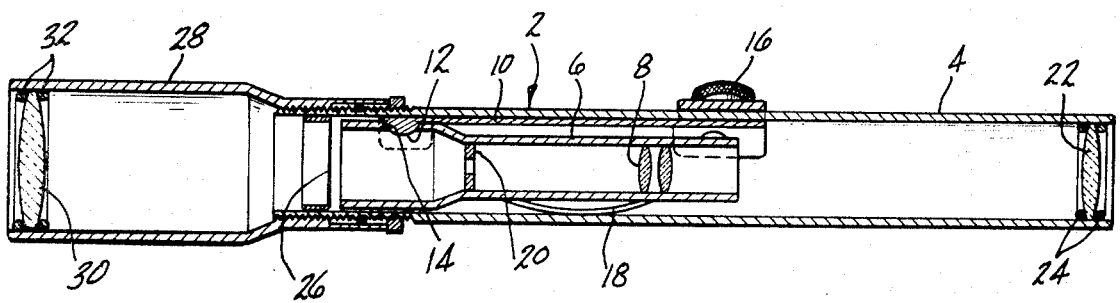

United States Patent [19]
Thompson

[11] 3,740,114
[45] June 19, 1973

[54] SEALING ARRANGEMENT FOR TELESCOPIC SIGHTS

[75] Inventor: John F. Thompson, El Paso, Tex.

[73] Assignee: W. R. Weaver Company, El Paso, Tex.

[22] Filed: Mar. 6, 1972

[21] Appl. No.: 232,140

[52] U.S. Cl. .................................... 350/67, 350/46
[51] Int. Cl. ............................................ G02b 23/16
[58] Field of Search ................ 350/67, 10, 46, 47, 350/76, 77

[56] References Cited
UNITED STATES PATENTS

| | | | |
|---|---|---|---|
| 3,297,389 | 1/1967 | Gibson | 350/10 |
| 2,472,739 | 6/1949 | Baker | 350/67 |
| 2,696,052 | 12/1954 | Czarnikow | 350/46 X |
| 2,990,830 | 7/1961 | Hett | 350/46 X |
| 3,684,376 | 8/1972 | Lessard | 350/10 X |

FOREIGN PATENTS OR APPLICATIONS 1,252,555   12/1960   France ................. 350/67

*Primary Examiner*—David H. Rubin
*Attorney*—Donald R. Motsko, H. Samuel Kieser and William W. Jones

[57] ABSTRACT

An arrangement for sealing the juncture between the ocular lens housing and the main scope barrel on a telescopic sight is provided. The seal prevents ambient air from entering the scope and fogging the internal opticas of the scope, and yet permits focussing of the ocular lens with respect to the remaining lenses and reticle in the scope.

1 Claim, 2 Drawing Figures

PATENTED JUN 19 1973 3,740,114

SEALING ARRANGEMENT FOR TELESCOPIC SIGHTS

This invention relates to an arrangement for mounting an ocular lens housing on a telescopic sight barrel, and more particularly, to an arrangement wherein the joint between the ocular housing and scope barrel is sealed against passage of ambient air into the interior of the scope and yet slidable so as to permit focussing and refocussing of the ocular lens with respect to the remaining lenses and reticle in the scope.

Modern telescopic sights generally comprise a plurality of lenses mounted in a tubular scope barrel. Such lenses may include an objective lens, collector lenses, image erecting lenses, and an ocular lens. Certain other lenses may also be included for performing specialized optical functions. The lenses used in modern scopes may be simple or compound lenses, depending on their function and cost factors. The objective lens is positioned at one end of the scope barrel, termed the objective end, and the ocular lens is positioned at the other end of the scope barrel, termed the ocular end. The remaining lenses are located within the scope barrel between the objective and ocular lenses, as is the scope reticle or aiming point. Thus, one surface of the ocular and objective lenses of the scope is exposed to the ambient atmosphere. The exposed surfaces thus can easily become fogged by ambient moisture, but can readily be wiped dry. The remaining surfaces of the ocular and objective lenses, and the remaining lenses in the scope are not readily accessible for cleaning, since they are within the scope barrel, and so they must be protected from ambient moisture to prevent them from fogging. One manufacturing step taken to prevent fogging of internal lenses in a scope is the charging of the interior of the scope barrel with a dry gas, such as nitrogen, or the like. This step purges the interior of the scope of ambient air upon assembly. The ocular and objective lenses are then sealed in place with air-tight resins, resilient rings, or the like, so as to keep ambient moisture from entering the scope barrel through its ends. Similar steps are taken to seal the windage and elevation adjustment turrets.

A problem relating to the maintenance of the moisture-free condition of the interior of the scope barrel has, however, plagued the industry. While the turrets can be readily sealed, and the ocular and objective lenses can be readily sealed in place in the scope barrel, many scope constructions require that the ocular and/or objective lenses be mounted for movement along the optical axes of the scope so as to be capable of being focussed with respect to the remainder of the lenses in the scope. This requirement of axial mobility dictates the use of a separate housing member which contains the ocular or objective lens, and which is threaded onto the main scope barrel so as to permit longitudinal displacement of the housing and contained lens with respect to the main barrel and its contained lenses. Thus, this sliding, threaded joint between the lens housing and the main barrel must be sealed to maintain the moisture-free condition of the interior of the scope. Sealing of this joint is particularly essential where the scopes are manufactured and assembled at high altitude locations, and are distributed, sold, and used at lower altitude locations, since the change in altitude of the locale of the scopes creates a partial vacuum between the interior of the scope and the lower altitude ambient surroundings. Thus, there is a tendency, in these cases, for ambient moisture at lower altitudes to be drawn into the interior of the scopes through the threaded joint resulting in fogging of the interior lenses, which fogging renders the scopes useless.

Several attempts have been made at solving the problem of leakage through the threaded joint between the lens housing and main scope barrel. One such solution is shown in U.S. Pat. No. 3,121,134, issued Feb. 11, 1964 to Joseph A. Heinzel. This solution involves the mounting of a resilient sealing ring on a locking collar which is threaded onto the main scope barrel adjacent to the lens housing. On assembly, the lens housing is positioned so as to place the housed lens in focus with the remainder of the lenses in the scope and the locking collar is then backed into the housing to lock the latter in place and to force the sealing ring tightly against the end of the housing and against the threads on the scope barrel. This arrangement provides a satisfactory seal so long as the locking ring and/or the lens housing are not moved from their assembled positions. It has been found, however, in practice, that the lens housing or locking ring may become accidentally displaced during use of the scope, or the user may need to refocus the housed lens because of visual requirements on the part of the user. Displacement of the lens housing or locking ring serves to break the seal with the result that the interior of the scope can be exposed to ambient moisture.

A second solution to this problem which has been attempted involves the use of a sealing ring positioned in a groove in the barrel threads. The lens housing is merely threaded onto the scope barrel and over the sealing ring. The ring is thus chewed up by the threads on the housing. This arrangement is unsatisfactory because it results in destruction of the sealing ring and the seal which it produces, and because it renders difficult fine focussing of the housed lens.

This invention solves the problem of sealing the joint between the lens housing and the main barrel by positioning a groove in the scope barrel threads and locating a resilient sealing ring in the groove. The mouth portion of the lens housing which is radially adjacent to the scope barrel is provided with an enlarged, smooth walled bore of a diameter larger than the major diameter of the thread. The enlarged housing bore merges into the threads on the housing and is of sufficient longitudinal dimension to permit longitudinal movement of the housing of the degree needed to focus the housed lens without causing the housing threads to override the sealing ring. Thus the sealing ring provides a seal between the barrel groove and the enlarged housing bore which is not deleteriously affected by longitudinal movement of the housing required to focus and refocus the housed lens. The only way that the seal is broken is by completely removing the housing from the barrel. Furthermore, a locking collar may be used in conjunction with the housing and threaded onto the barrel in advance of the housing. The collar can be backed down against the housing to lock the latter in its focussed position. By limiting the longitudinal length of the barrel threads, the collar can serve as a blocking member which also prevents the housing from being threaded onto the barrel to an extent wherein the sealing ring would be accidentally overrun by the housing threads.

It is, therefore, an object of this invention to provide an arrangement for sealing the threaded joint between the main scope barrel and a lens housing on a telescopic sight.

It is a further object of this invention to provide a sealing arrangement of the character described which permits longitudinal movement of the lens housing relative to the scope barrel sufficient to permit focussing of the housed lens with respect to the remaining lenses in the scope without disturbing the seal.

Figure 2:
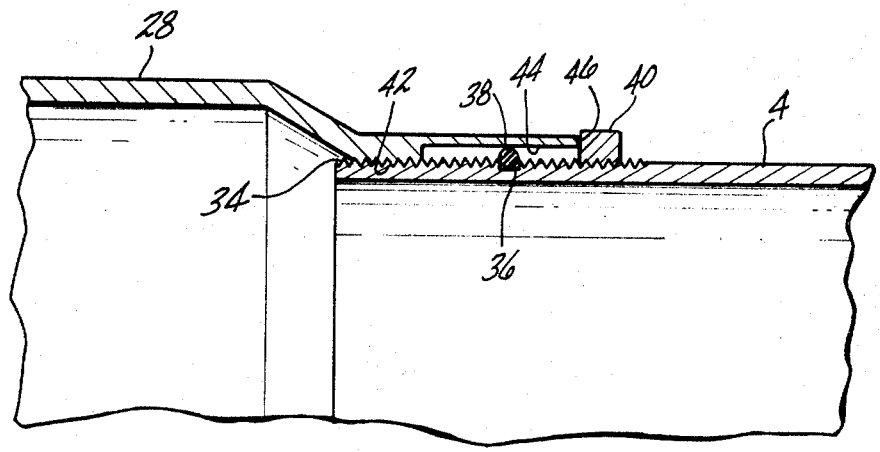

These and other objects and advantages of the invention will become more readily apparent from the following detailed description of a preferred embodiment of the invention taken in conjunction with the accompanying drawings, in which:

FIG. 1 is a vertical sectional view of a telescopic sight having a preferred embodiment of the sealing arrangement of this invention at the threaded joint between the ocular housing and the main barrel portion of the scope; and FIG. 2 is a sectional view, enlarged for clarity and with parts omitted, showing details of the threaded, sealed joint between the ocular housing and the main scope barrel.

Referring now to the drawings, there is shown a telescopic sight 2 having a main barrel portion 4. The scope barrel 4 houses an erector support tube 6 containing image-erecting lenses 8 and a sleeve 10 having an inwardly projecting ball 12 which engages a socket 14 in the erector tube 6, the ball and socket 12 and 14 respectively, providing a universal pivoting mount for the erector tube so that the latter can be pivoted within the scope barrel 4 to permit windage and elevation adjustments. The windage and elevation adjustments are accomplished by shifting the viewed image in a conventional manner. Windage and elevation adjustment turrets 16 are mounted on the scope barrel 4 and contain threaded adjustment means which contact the outer surface of the erector tube 6 in a conventional manner. A spring member 18 biases the erector tube against the adjustment means. The erector tube 6 also contains a field-defining diaphragm 20. An objective lens 22 is mounted in one end of the scope barrel and is sealed in place by means of sealing rings 24, thus the objective lens seals the objective end of the interior of the main scope barrel. A reticle 26 is mounted in the main scope barrel at the second image plane. An ocular housing 28 is threaded onto the end of the main scope barrel remote from the objective lens, the ocular housing containing an ocular lens 30 which is sealed in place by sealing rings 32, thus the ocular lens 30 and its associated sealing rings 32 seal the ocular end of the interior of the scope.

Referring particularly to FIG. 2, the main scope barrel 4 has a portion of its exterior which is threaded as at 34. The threaded portion 34 of the main barrel 4 is provided with an O-ring groove 36 in which is positioned a resilient O-ring 38. A locking collar 40 is threaded onto the threaded portion of the barrel as is the ocular housing 28. An interior portion of the ocular housing 28 is threaded as at 42 so that the ocular housing 28 can be screwed onto the threads 34 of the main barrel 4. A portion of the interior of the ocular housing 28 is counterbored as at 44 to provide a smooth walled bore which extends from the end 46 of the ocular housing 28, which end 46 is radially adjacent to the scope barrel 4. The smooth bore 44 in the ocular housing 28 is of sufficient longitudinal extent so as to permit the ocular housing tube to be moved longitudinally with respect to the scope barrel 4, sufficiently to focus the ocular lens 30 on the reticle 26 and on the target image which appears in the second image plane of the scope without exposing the O-ring 38 to the threads 42 on the ocular housing 28. It will be noted that the ocular housing 28 can be moved to either the left or right of the position shown in FIG. 2 to refocus the ocular lens without disengaging the O-ring 38 from sealing engagement from the smooth bore 44 and without subjecting the O-ring 38 to the ocular housing threads 42. Assembly of the sealed joint is accomplished as follows. The locking collar 40 is threaded onto the threaded portion of the main barrel to a point on the objective side of the O-ring groove 36. The O-ring 38 is then mounted on the O-ring 36 and the ocular housing 28 is then threaded on to the threaded portion 34 of the scope barrel 4 so as to move the O-ring 38 into the smooth bore 44 of the ocular housing 28. The ocular lens 30 is then focussed on the second image plane of the scope and the locking collar 40 is backed down against the mouth 46 of the ocular housing 28 to lock the ocular housing in place.

It will be readily appreciated that the seal formed between the ocular housing, which is threaded onto the barrel, and the barrel will not be disturbed by intentional or accidental longitudinal movement of the ocular housing with respect to the main barrel. The O-ring which forms the seal between the ocular housing and main barrel is not harmed when the scope is assembled and retains its effectiveness during focussing and refocussing of the ocular lens. The sealing arrangement of this invention is of a very simple construction, inexpensive, and easily produced. Presently existing scopes could be easily modified to incorporate the sealing arrangement of this invention. It is further noted that the locking collar can serve as a safe guard against accidentally exposing the O-ring to the ocular housing threads by controlling the width of the locking collar and the longitudinal extent of the barrel threads so that the locking collar, when threaded to the fullest possible extent onto the barrel, can limit the extent to which the ocular housing can be threaded onto the barrel. This extent to which the ocular housing can be threaded onto the barrel can be controlled so that the O-ring always remains in the smooth bore of the ocular housing even when the latter is threaded onto the barrel to its fullest possible extent.

Since many changes and variations of the disclosed embodiment of the invention may be made without departing from the inventive concept, it is not intended to limit the invention otherwise than as required by the appended claims.

What is claimed is:

1. In a telescopic instrument having a main barrel part containing lenses and having an end portion at least a part of which is threaded and which terminates at an end wall, the instrument further having a housing part containing lenses and having an end portion at least a part of which is threaded and which terminates at an end wall wherein the threaded portions of the barrel and housing form a threaded joint by which the barrel and housing are connected to each other, a structure for sealing the threaded joint, which structure comprises:

a. means forming a groove in the threaded end portion of said barrel;

b. a resilient O-ring mounted in said groove in gas-sealing engagement with side walls thereof;

c. means forming a smooth walled area adjacent the threaded portion of said housing, said smooth walled area being radially outwardly offset from the threaded portion of said housing, and said smooth walled area extending to the end wall of said housing, said O-ring being in gas-sealing engagement with said smooth walled area to seal said threaded joint, and said smooth walled area being of sufficient longitudinal extent to permit longitudinal movement of said housing of an extent necessary to focus and refocus the lenses housed in said housing; and d. a locking collar threaded onto said threaded end portion of said barrel adjacent said housing and operable to be screwed against said housing to lock the latter in place on said barrel, said locking collar, when threaded onto said barrel to the fullest extent possible, preventing said housing from being threaded onto said barrel to an extent wherein said O-ring would be contacted by said threaded portion of said housing.

* * * * *